Patented Aug. 29, 1944

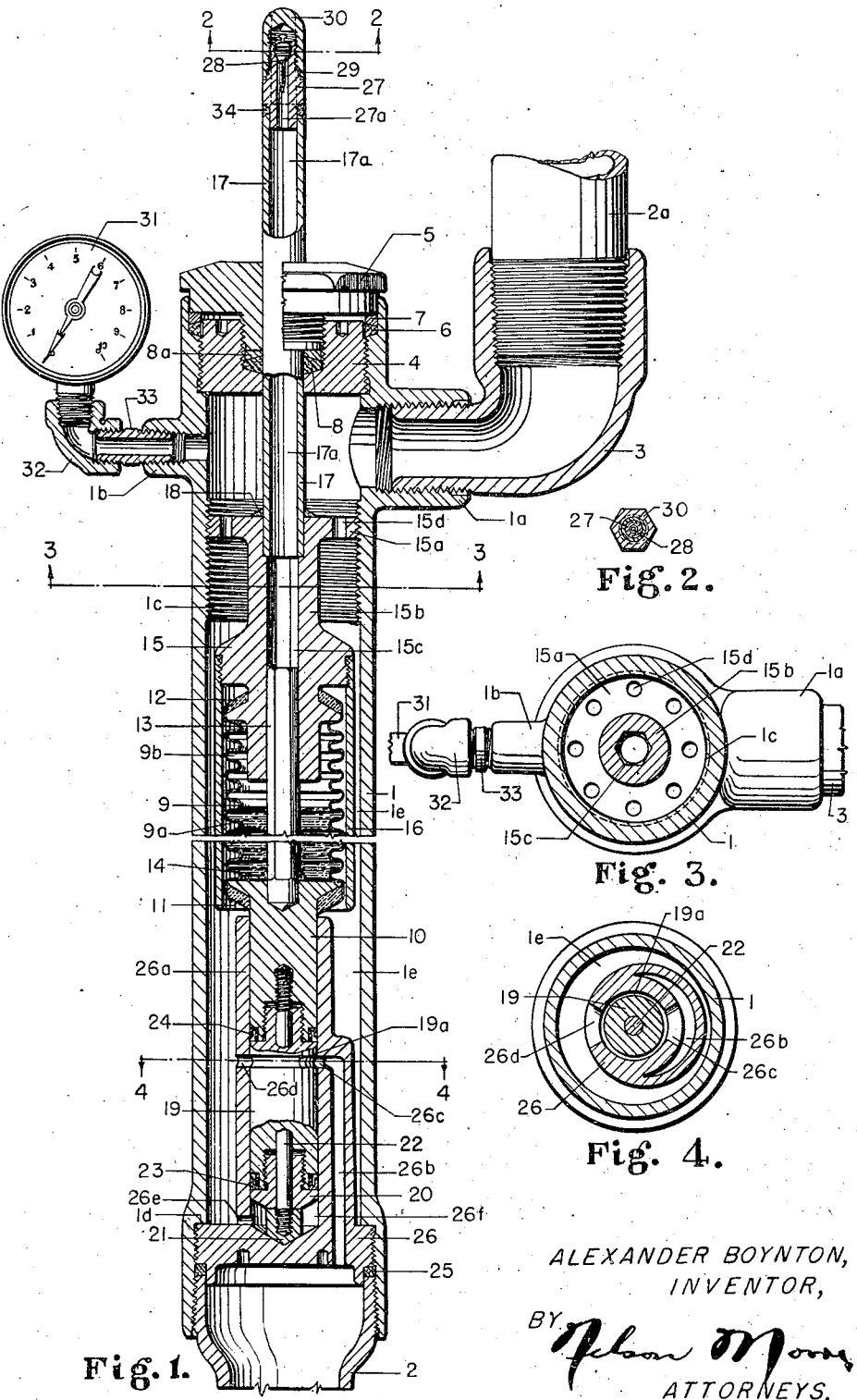

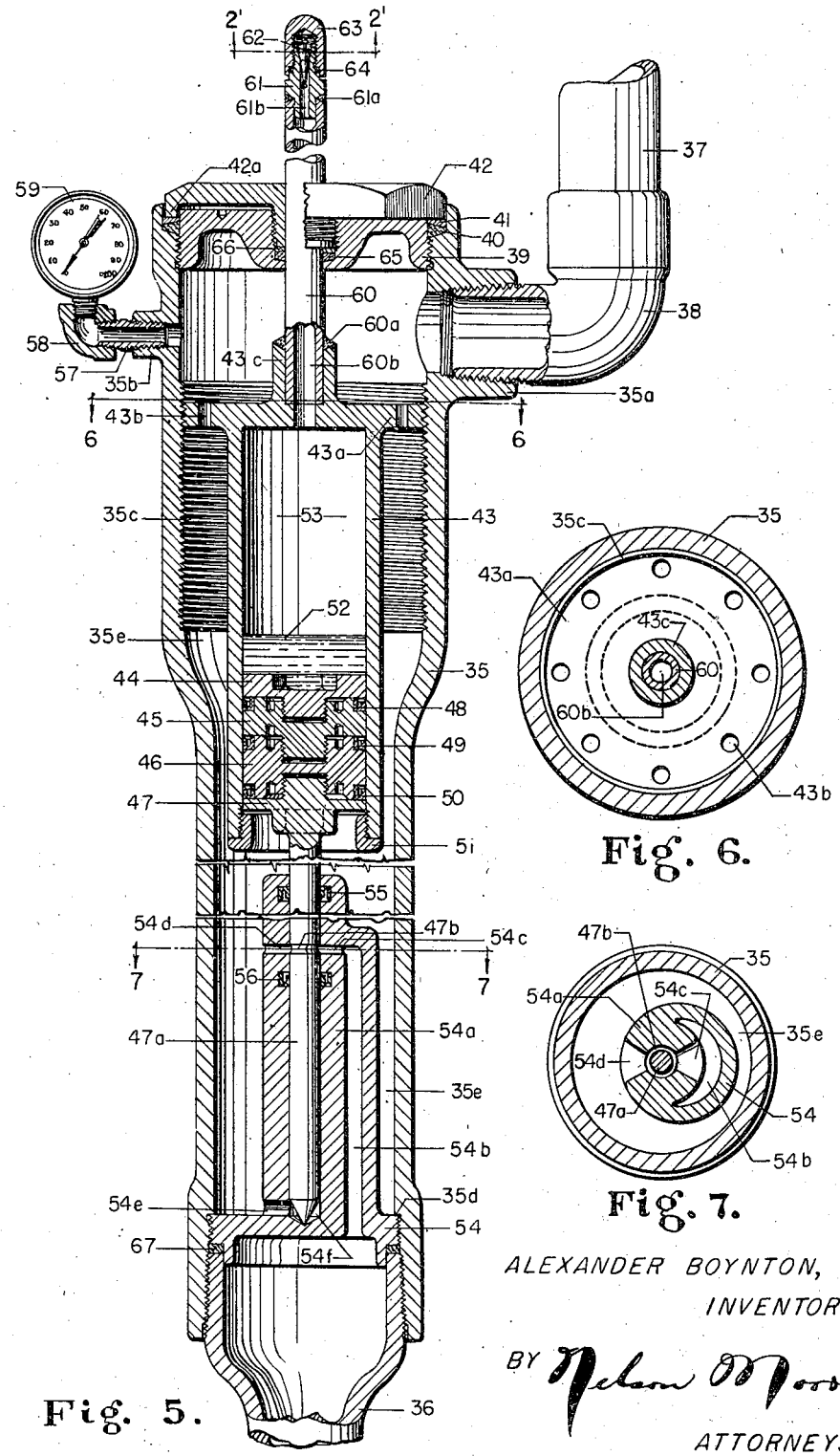

2,356,748

UNITED STATES PATENT OFFICE 2,356,748

PRESSURE REGULATOR

Alexander Boynton, San Antonio, Tex.

Application September 13, 1941, Serial No. 410,781

15 Claims. (Cl. 50—23)

My invention relates to pressure regulators, particularly to regulators for maintaining a uniform pressure within a pipe line or gas reservoir.

An object of the invention is to provide a device which automatically controls a valve to limit the maximum value of pressure fluid discharged into and out of the device from a supply source of fluid under greater pressure.

Another object is to provide a regulator which may be easily and quickly adjusted to vary the pressure of the fluid discharged into a pipe line or other receptacle leading from it, regardless of the greater value of the fluid supplied to the regulator.

Another object is to provide a regulator having a large range of variation in its adjustments and which will reduce extremely high pressures to relatively very low pressures.

Another object is to provide a slide valve having its movements unaffected by the high pressure which it controls.

A further object is to provide a pressure regulator having relatively few parts, inexpensive to manufacture and which will be of long life in service.

In carrying out the invention, I employ a pressure responsive element attached to a valve which closes the intake at a predetermined pressure obtaining within the regulator.

The particular construction and arrangement of parts will be more clearly understood from the following specification and accompanying drawings, in which—

Fig. 1 is a longitudinal section through the preferred embodiment.

Fig. 2 is a cross section on the line 2—2, Figs. 1 and 5.

Fig. 3 is a cross section on the line 3—3, Fig. 1.

Fig. 4 is a cross section on the line 4—4, Fig. 1.

Fig. 5 is a longitudinal secton through a modified form of the invention.

Fig. 6 is a cross section on the line 6—6, Fig. 5.

Fig. 7 is a cross section on the line 7—7, Fig. 5.

Section 2'—2', Fig. 5, of the modified construction is identical in form with section 2—2, Fig. 1, but the parts cut by these sections bear different reference characters, hence the section is primed, in Fig. 5.

Similar characters of reference are employed to designate similar parts throughout the several views.

Referring to Fig. 1 of the drawings, it will be observed that the device is installed within a housing nipple 1 having the lateral bosses 1a and 1b. The high pressure intake line 2 has threaded connection with the nipple 1, the joinder being made hermetic by means of the packing 25. The street elbow 3 serves to connect the low pressure discharge line 2a with the boss 1a of the housing nipple 1.

The pressure gauge 31 has connection with the boss 1b of the housing nipple 1 by means of the elbow 32 and the nipple 33 for the evident purpose of enabling the operator to check the value of the pressure fluid discharged by the regulator into the line 2a.

The valve housing member 26 has threaded connection within the nipple 1 and lands upon an annular shoulder 1d. The packing 25 serves the further purpose of making this connection hermetic so that all pressure fluid seeking to escape from the high pressure intake pipe line 2 into the annular opening 1e must pass through the longitudinal opening 26b, the lateral intake opening 26c, the circumferential groove 19a, and the lateral discharge opening 26d.

The plug 4 has threaded connection within the upper portion of the housing nipple 1. The packing 6 is compressed by the gland ring 7 by force of the threaded engagement between the plugs 4 and 5 in order to arrest any possible leakage along the threads connecting the nipple 1 and the plug 4.

The bellows 9 is joined hermetically to its first end connection member 15 by the solder or weld 12 and is joined hermetically to its second end connection 10 by the solder or weld 11. The guide shell 16 having small clearance over the bellows 9 is joined threadedly to the connection 15 and serves to restrain the bellows from lateral movements during its contractions and elongations in operation which will be explained later.

The lower portion of the bellows second end connection 10 and the valve members 19 and 20 have a close sliding fit within the bore 26f of the sleeve 26a.

The valve member 19 has threaded connection with the connection 10 and the valve member 20. The rod 22, closely received axially of the valve members 19 and 20, has threaded connection within the connection 10 and serves to secure the members 10, 19, and 20 firmly together by means of the lock nut 21 which lands upon the floor of a central bore 26f which extends axially of the sleeve 26a. In this manner, the circumferential groove 19a is positioned normally in registration with the lateral intake opening 26c and the lateral discharge opening 26d of the sleeve 26a.

It is apparent that the groove 19a may be replaced by a passage through the valve member if simple means, such as a pin and slot, be provided to cause such passage to remain alignable with the openings 26c and 26d. If this be done, however, other equally simple means than that shown would have to be provided for adjusting the value of the compressed air force within the pocket 9b, as will be apparent when the operation is discussed.

This is the open position of the valve mechanism. In assembling the regulator, the flanged portion 15a always should be screwed downward far enough within the threads 1c of the housing nipple that the lock nut 21 will land upon the floor of the bore 26f in order that the valve mechanism will be open until it is closed by pressure fluid entering the regulator through the openings 26b, 26c, the recess 19a, and the opening 26d, in the order named.

The U cup 23, which may be of leather or other tough yieldable fabric, is received within an annular recess exterior of the lower extremity of the member 19. The similar U cup 24 is received within another annular recess exterior of the lower extremity of the bellows second end connection 10. The U cups 23 and 24 closely slidable within the bore 26f of the sleeve 26a, face each other so as to become expanded against the shell by pressure fluid entering through the lateral intake opening 26c and seeking to escape upward or downward through the small clearance between the male members 10, 19, and 20 and the female member 26a. Manifestly the U cups 23 and 24 may be replaced by another suitable form of packing. The valve freeing port 26e serves to prevent the valve member 20 from impinging upon fluid during the downward stroke and also serves to prevent this member from pulling a vacuum during the upstroke. In all other pressure regulators known to this applicant the valve closes against the high pressure.

It is apparent that the nipple 1 and the valve housing member 26 may be cast in one part. Likewise the bellows second end connection 10, the valve member 19, and the other valve member 20 may be formed in one part, thereby eliminating considerable machine work and the securing rod 22.

The first connection member 15 has a neck 15b and an upper annular flanged portion 15a which has threaded engagement within the housing nipple 1 within the threads 1c. The openings 15d allow passage of pressure fluid from the annular opening 1e into the low pressure discharge line 2a.

The hexagon rod 13, having its lower end turned cylindrical and pressed into the bellows second end connection 10 to which it is secured by the weld 14, is closely slidable within the hexagon opening 15c central of the bellows first end connection 15. The rod 13, within the closely conforming hexagon opening 15c serves to transmit rotary thrust from the hexagon bushing 27 connected to the member 15 by the tubular stem 17, to the bellows second end connection 10 as the flange 15a is screwed upward or downward to adjust the air pressure within the bellows as will be explained. This arrangement prevents the rotary thrust during such adjustments from being borne by the bellows.

The tubular stem 17, closely slidable within a central axial opening through the members 4 and 5, may have its lower end pressed into a central bore within the upper end of the member 15 and may be secured there by the weld 18. The packing 8, compressed by the plug 5 acting upon the gland ring 8a, serves to prevent leakage of pressure fluid between the stem 17 and the members 4 and 5.

The hexagon bushing 27 may have its lower end turned cylindrical and pressed into the stem 17 where it may be secured by the weld 34.

The bellows 9 may be partially filled with a lubricant 9a leaving an air pocket 9b of sufficient length so that the bellows cannot be damaged by external pressure. The lubricant acts as a stop to limit the compression of the bellows, no matter how great the external pressure may be. The air can be placed in the bellows through the openings 27a, 17a, 15c, and the slight clearance around the hexagon rod 13, the valve 28 serving to confine the air in the bellows until the cap 30 can be screwed down upon the packing 29 which serves to prevent any leakage of air out of the bellows.

Preferably, the air should be placed in the bellows after the regulator is assembled in order to prevent the bellows from being unduly elongated by the internal pressure. The best presently known mode of applying the invention will be described now.

*Operation, Fig. 1*

In operation of the regulator illustrated in Fig. 1, fill the air pocket 9b of the bellows with air of the same or slightly less value as that of the average pressure to be maintained by the regulator in the low pressure line 2a. When this is done, the flanged portion 15a of the connection member 15 preferably should be positioned midway of the threads 1c of the housing nipple 1, so that the air pressure within the bellows may be increased by screwing the member 15 downward in the threads 1c or may be decreased by screwing it upward, as may be required for varying the regulator adjustment, without the necessity of putting additional air into the bellows or releasing part of the air each time a different pressure is desired in the low pressure line 2a.

The flanged portion 15a may be screwed upward or downward within the housing nipple 1 far enough to allow for all necessary adjustments by means of a wrench applied to the hexagon portion of the member 27, as is apparent.

It will be noted that the length of the engagement between the members 13 and 15 and the length of the hexagon opening 15c is such as will allow ample room for compressing or elongating the bellows for the purpose of making such adjustments.

At a very slightly greater pressure exterior of the bellows 9 than that obtaining within the air pocket 9b within the bellows, the bellows will contract, thereby raising the circumferential groove 19a out of registration with the openings 26c and 26d. This cuts off the intake of the regulator and results in maintaining a constant pressure around the bellows and in the line 2a.

Since air compresses directly in proportion to the pressure applied, it will be noted that an air pocket three inches long within the bellows will be contracted far enough to cause the discharge opening 26d to close at a pressure only slightly greater than that obtaining within the bellows.

When the valve member 19 is raised so as to place the groove 19a out of registration with the lateral openings 26c and 26d, the pressure fluid contacting the valve member 19 through the opening 26c will force this valve member 19 into a metal to metal contact with the opposite side of the sleeve 26a, thereby securely closing the discharge opening 26d; while the U cups 23 and 24 will expand and close the clearance thus caused at all other places around the members 10, 19, and 20. The openings 26c and 26d preferably should be of a narrow slot-like shape, as appears in Fig. 4, for the purposes of admitting a large volume of pressure fluid when the valve mechanism is open and of closing off the flow thereof by only a slight contraction of the bellows.

Manifestly, the distance between the U cup 24 and the upper end of the sleeve 26a and the distance between the U cup 23 and the openings 26c and 26d should be somewhat greater than the total compression movement of the bellows, in order that the cup 24 will remain at all times within the sleeve 26a and in order that the cup 23 will never be damaged by contacting the lateral openings.

Attention is directed to the fact that metallic bellows are now available made of stainless steel, monel metal, and numerous brass alloys which will withstand great internal pressures and which will not fatigue under the number of flexings which would occur ordinarily in several years of such as is herein contemplated.

Several available makes of metallic bellows will withstand compressing or stretching up to 15% of their free length without becoming deformed.

Preferably, the air pocket 9b within the bellows should be of such length as will not allow the bellows to be compressed far enough to damage it. Excessive stretching of the bellows is prevented by landing of the lock nut 21 upon the floor of the bore 26f.

By way of illustration, it will be assumed that there is 2000 pounds of pressure fluid within the high pressure pipe line 2 and that a constant pressure of 500 pounds is desired in the low pressure line 2a. Solution: Fill the air pocket 9b of the bellows with air under 475 pounds pressure and screw the flange 15a downward until the gauge 31 registers 500 pounds. It is evident that screwing the flange 15a upward will lessen the compression force within the air pocket 9b and consequently will decrease the discharge pressure, and that screwing it downward will increase the air pressure within the bellows and thereby increase the discharge pressure.

Bellows 1½ to 2½ inches in diameter by a length of 10 to 15 inches will be found satisfactory for these purposes. The air pocket 9b may be 2 to 4 inches long depending upon the length of bellows employed.

In Fig. 5, illustrating a modified construction, the housing nipple 35, having the bosses 35a and 35b, has threaded connection with the high pressure line 36. The closure plug 39 has threaded connection with the housing nipple 35. The gland plug 42 has threaded connection within the plug 39 and engages the gland ring 66 which, in turn, is adapted to compress the packing 65 for the purpose of preventing the escape of pressure fluid along the periphery of the tube 60. The gland plug 42 has a depending circular flange 42a which engages the gland ring 41 for the purpose of compressing the packing 40 which prevents the escape of pressure fluid along the threads between the members 35 and 39.

The low pressure line 37 has threaded connection with the street elbow 38 which in turn has similar connection into the boss 35a of the housing nipple 35.

The pressure gauge 59 has connection with the boss 35b of the housing nipple by means of the nipple 57 and the elbow 58.

The valve housing member 54 has threaded connection within the housing nipple 35 where it lands upon the annular internal shoulder 35d. The packing 67 engaged by the end of the swaged pipe 36 prevents leakage of pressure fluid along the threads connecting the housing nipple 35 with the members 36 and 54. The sleeve 54a of the latter member has a central axial bore 54f within which the valve rod 47a, depending from the piston base 47, has a closely slidable fit. The valve freeing port 54e prevents the valve rod 47a from impinging upon fluid during the downward movement of this rod and prevents it from pulling a vacuum during its upward movement.

Pressure fluid enters the annular space 35e within the housing nipple from the high pressure line 36 via the longitudinal opening 54b, the lateral intake opening 54c, the peripheral groove 47b, and the lateral discharge opening 54d in the order named. The peripheral groove 47b is in registration with the openings 54c and 54d when the lower end of the valve rod 47a is landed upon the floor of the bore 54f. This is the open position of the valve, as shown in Fig. 5. Pressure fluid entering the annular space 35e passes through the openings 43b and thence escapes into the low pressure line 37.

The U cups 55 and 56 which may be of leather, fabric, or the like, received within circular openings withing the wall of the sleeve 54a, closely surround the valve rod 47a and face each other in order to prevent any leakage of pressure fluid between the rod and its sleeve when the valve is closed by upward movement of the valve rod, as will be explained.

The piston head 44 has threaded connection with the piston section 45 which has threaded connection with the piston section 46 which in turn has similar connection with the piston base 47. Each of said piston members has a closely slidable fit within the polished surface of the cylinder 43. The U cups 48, 49, and 50, which may be of leather, fabric, or the like, are fitted within the circular peripheral recesses of the piston members 45, 46, and 47, respectively. These cups closely engaging the wall of the cylinder all face upward in order to prevent any escape of the lubricant 52 or of pressure fluid out of the chamber 53.

The stop ring 51, threadedly engaged within the cylinder 43, serves to prevent the piston assembly from being forced out of the cylinder by pressure fluid within the chamber 53 if the regulator should be taken apart while the chamber is so charged.

The cylinder 43 has a threaded radial flange 43a engaging with the internal threads 35c of the housing nipple 35 and an upstanding flange 43c within which the tube 60 is pressed and secured there by the weld 60a. This tube has a closely slidable fit through the plugs 39 and 42, the gland ring 66, and the packing 65.

The hexagon bushing 61 has its lower end of reduced diameter pressed into the tube 60 where it is secured by the weld 61a. By means of the openings 60b through the tube 60 and 61b through the bushing 61, compressed air of any desired value may be placed within the chamber 53, the valve 62, cap 63, and packing 64 serving to confine the same securely. The best presently known mode of applying the invention as disclosed in the modified construction will be described briefly now.

*Operation, Fig. 5*

In operation, the regulator being assembled as shown in Fig. 5, compressed air of approximately the value of the pressure fluid desired to be discharged into the line 37 is placed within the chamber 53. When pressure fluid of a greater value enters the annular space 35e via the openings 54b, 54c, the groove 47b, and the opening 54d, the piston assembly will be forced upward carrying with it the valve rod 47a and thereby closing the valve. When the valve is thus closed, the pressure fluid acting through the opening 54c will force the rod 47a firmly against the opening 54d and will close it securely. At the same time, the pliable cups 55 and 56 will conform closely to the rod 47a, thus preventing any leakage into the regulator from the high pressure line 36 while the valve is closed.

If it be desired to raise the value of the fluid discharged through the regulator, this may be done by screwing the flange 43a downward by applying a wrench to the hexagon bushing 61. This will compress the air further within the chamber 53, thereby requiring greater pressure within the annular space 35e to operate the piston and valve. By screwing the flange 43a upward, the chamber 53 will be increased in length, thereby lowering the air pressure within it, and consequently, reducing the pressure of the fluid which will be discharged then into the line 37.

The lubricant 52 not only lubricates the piston in its movements, but it also acts to form a liquid seal against the escape of air seeking to pass by the piston and cups.

Manifestly, in order to avoid damaging the U cups, the distance between the groove 47b and the cup 55 and the distance between the lower end of the rod 47a and the cup 56 should be somewhat greater than the length of the piston travel.

It is apparent that many minor changes in construction and re-arrangement of parts and the substitution of other parts for those shown can be made within the scope and purpose of the stated objects and appended claims and I reserve the right to make such changes, re-arrangements, and substitutions.

Where introductory expressions and functional statements are employed in the claims to follow, it will be understood that such expressions and statements relate to the best presently known mode of applying the invention, and are not to be regarded as limitations upon the claims, which contemplate that the invention will be applied to other and various uses.

I claim:

1. In a pressure regulator: a housing nipple having an intake and a discharge connection; a bellows first end connection threadedly secured within said housing nipple proximate said discharge connection; a valve housing member transverse of said housing nipple proximate said intake connection; a sleeve upon said valve housing member, said sleeve having a longitudinal opening for fluid, and a lateral intake opening; a hermetically closed pressure responsive bellows secured upon said first end connection; a second end connection upon said bellows; a valve member secured upon said second end connection, said valve member and said second end connection being slidable within said sleeve, said valve member having a circumferential groove; a drain port through a wall of said sleeve, said port communicating between said valve member and the interior of said housing nipple; hermetically sealed means between said sleeve and said second connection and valve member; means connected to said valve member for causing said groove to register with said intake and discharge openings when said bellows is distended; a liquid in said bellows; gaseous fluid in said bellows limiting the compression thereof; means aligning said bellows with said housing nipple; means for varying the value of the compressed gaseous fluid within said bellows; and adjusting means for varying the force required exteriorly of said bellows to cause said valve member to move said circumferential groove out of registration with said intake and discharge openings.

2. In a pressure regulator: a housing nipple having an intake and a discharge connection; a bellows first end connection adjustably secured within said housing nipple; a valve housing member transverse of said housing nipple; a sleeve having intake and discharge openings upon said valve housing member, said valve housing member having an inlet opening for fluid communicating with the sleeve intake opening; a hermetically sealed pressure responsive bellows secured upon said first end connection; a second end connection upon said bellows; a valve member upon said second end connection, said valve member and said second end connection being slidable in said sleeve, said sleeve having a valve freeing port therein, said port communicating between said valve member and said housing nipple, said valve member providing a passageway having communication between said intake and discharge openings when said bellows is distended; a liquid in said bellows; gaseous fluid in said bellows; and means for varying the force required to cause said bellows to move said valve member to close said inlet and discharge openings.

3. In a pressure regulator: a housing nipple having intake and discharge connections; a bellows first end connection adjustably positioned within said housing nipple; a valve housing member having an opening for flow of fluid into said housing nipple; a sleeve having transverse openings upon said valve housing member, said openings communicating with said housing member opening; a hermetically sealed bellows having gas within, and being secured upon said first end connection; a second end connection upon said bellows, said second connection being slidable within said sleeve; means upon said second connection providing communication between said intake and discharge openings; means for varying the pressure of gas within said bellows; and means for varying the force required to close said intake and discharge openings.

4. In a pressure regulator: a housing nipple having a pressure responsive bellows therein secured at one end and free at the other; means for connecting the opposite ends of said nipple into a conduit for fluid under pressure; a valve housing member hermetically secured within said nipple and having a bore therein; said nipple and said valve housing member having a passage for fluid therethrough; a valve upon the free end of said bellows and slidable within the bore of said valve housing member, said valve housing member having a port communicating between said bore and said nipple to free said valve; and means upon said valve to open said passage when the bellows is distended responsive to low pressure upon it and to close said passage when said bellows is compressed by high pressure upon it.

5. In a pressure regulator: a housing nipple;

a cylinder therein; means for adjusting the position of said cylinder; a valve housing member in said nipple and having a bore, a longitudinal opening, and intake and discharge openings transverse of said bore and communicating with said longitudinal opening; a piston slidable in said cylinder; a valve rod connected to said piston and slidable in said bore; and means for exposing one end of said piston to fluid under pressure within said nipple so that said valve will close said intake and discharge openings at a higher pressure within said nipple than within said cylinder.

6. In a device of the character described: a housing nipple; a cylinder therein; a valve housing member in said nipple, said member having a bore, a longitudinal opening, and intake and discharge openings transverse of said bore and communicating with said longitudinal opening; a piston slidable in said cylinder; a valve rod connected to said piston; and means for exposing one end of said piston to fluid under pressure within said nipple so that said valve will close said intake and discharge openings at a higher pressure within said nipple than that obtaining within said cylinder.

7. In a device of the character described: a housing nipple; a cylinder therein; a valve housing member having a bore, a longitudinal opening and intake and discharge openings, said openings being transverse of said bore and communicating with said longitudinal opening; a piston slidable in said cylinder; a valve rod connected to said piston and slidable in said bore; gas in said cylinder; means for varying the compression of said gas; means for exposing one end of said piston to fluid under pressure within said nipple so that said valve will close said intake and discharge openings at a higher pressure within said nipple than that obtained within said cylinder; and means for adjusting the position of said cylinder.

8. In a pressure regulator: a housing nipple having fluid pressure inlet and discharge connections; means within said nipple responsive to fluid pressure in said discharge connection; valve means connected to said pressure responsive means; and means within said pressure responsive means limiting the action thereof and of such character that the fluid pressure at which said valve means controls fluid flow may be varied; orifice containing means connected to said pressure responsibe means and constructed to adjust the pressure therewithin, whereby fluid flow past said valve means is controlled by the fluid pressure within said discharge connection.

9. In a pressure regulator: a pressure responsive element; a housing nipple embracing said element and forming a conduit for fluid under pressure; a valve housing member hermetically secured within said nipple and having an opening for fluid therethrough and a bore transverse of said opening; a valve connected to said element, said valve being slidable in said housing member and arranged to close said transverse bore at a predetermined pressure upon said element; and orifice containing means connected to said pressure responsive element and constructed to adjust the pressure therewithin.

10. In a pressure regulator: a pressure responsive element; a housing nipple embracing said element and forming a conduit for fluid under pressure; a valve housing member connected to said nipple and having an opening for fluid therethrough and a bore transverse of said opening; a valve free to move in opposite directions and responsive to said element, said valve being slidable in said housing member and arranged to close said transverse bore at a predetermined pressure upon said element; hermetic means for maintaining the pressure responsiveness of said element; and orifice containing means connected to said pressure responsive element and constructed to adjust the pressure therewithin.

11. In a pressure regulator: a housing nipple for fluid under pressure; a pressure responsive element connected to said nipple; a valve housing member within said nipple and hermetically sealed therewith, said valve housing having a passage for fluid therethrough, a portion of said passage being transverse of said housing; a slide valve in said valve housing member, said valve being normally open and actuated by said pressure responsive element to close the transverse portion of said passage at a predetermined force upon said element; and orifice containing means connected to said pressure responsive element and constructed to adjust the pressure therewithin.

12. In a pressure regulator: a housing nipple; a pressure responsive element connected to said nipple; a valve housing member within said nipple and hermetically sealed therewith, said valve housing having a bore therein and a passage for fluid therethrough, a portion of said passage being transverse of said bore; a slide valve in said bore, said valve being normally open and actuated by said pressure responsive element to close said transverse portion at a predetermined force upon said element; means for varying the actuating force on said element; and orifice containing means connected to said pressure responsive element and constructed to adjust the pressure therewithin.

13. In a pressure regulator: a housing nipple, said nipple having an opening therethrough, part of said opening being longitudinal and part being partially transverse of said nipple and a bore intersecting the transverse portion of said opening; a pressure responsive element in said nipple; a normally open valve operable by said pressure responsive element to close said transverse opening at a predetermined fluid pressure upon said element; and orifice containing means connected to said pressure responsive element and constructed to adjust the pressure therewithin.

14. In a pressure regulator: a body member having inlet and outlet connections and a channel for fluid flow therebetween; valve means in said channel operative to control fluid flow therethrough; pressure responsive means subject to the pressure of fluid flowing through said channel and operatively connected to said valve means; and means within said pressure responsive means limiting the action thereof, said means being of such character that action of said pressure responsive means may be varied in response to fluid pressure in said channel by orifice containing means connected to said pressure responsive means and constructed to adjust the pressure therewithin.

15. In a pressure regulator: a housing nipple having an intake and a discharge connection; a valve housing member removably and hermetically secured transversely of said housing nipple and having a sleeve extending inwardly of said housing nipple toward the discharge connection thereof, said valve housing member and its sleeve having a longtudinal passage for fluid terminating in a lateral intake opening, said sleeve having a lateral discharge opening and a valve freeing port; a valve member longitudinally slidable in said sleeve, said valve member having means operable when said valve member is in one position for effecting communication between said lateral intake and discharge openings; means to prevent escape of fluid around said valve member on either side of said communication-effecting means; fluid-pressure-responsive means for actuating said valve member; and means at all times preventing said valve member from closing said valve freeing port.

ALEXANDER BOYNTON.